United States Patent [19]
Tsunoda et al.

[11] Patent Number: 5,548,765
[45] Date of Patent: Aug. 20, 1996

[54] POWER SAVING DISPLAY SUBSYSTEM FOR PORTABLE COMPUTERS

[75] Inventors: Takeo Tsunoda; Hitomi Aizawa; Yuji Hama, all of Suwa, Japan

[73] Assignee: Seiko Epson Corporation, Tokyo-to, Japan

[21] Appl. No.: 205,336

[22] Filed: Mar. 2, 1994

Related U.S. Application Data

[63] Continuation of Ser. No. 741,016, Aug. 6, 1991, abandoned.

[30] Foreign Application Priority Data

Aug. 28, 1990 [JP] Japan .................................. 2-225709

[51] Int. Cl.$^6$ .................................................. G06F 1/00
[52] U.S. Cl. ...................... 395/750; 364/DIG. 1; 359/630
[58] Field of Search ........................... 395/750; 364/200, 364/900, DIG. 1; 359/630

[56] References Cited

U.S. PATENT DOCUMENTS

| | | | |
|---|---|---|---|
| 3,941,989 | 3/1976 | McLaughlin et al. | 395/750 |
| 4,051,326 | 9/1977 | Badagnani et al. | 395/750 |
| 4,317,181 | 2/1982 | Teza et al. | 364/900 |
| 4,545,030 | 10/1985 | Kitchin | 364/900 |
| 4,782,355 | 11/1988 | Sakai et al. | 395/750 |
| 4,809,163 | 2/1989 | Hirosawa et al. | 395/750 |
| 4,901,283 | 2/1990 | Hanburg et al. | 395/750 |
| 4,922,448 | 5/1990 | Kunieda et al. | 395/750 |
| 4,980,836 | 12/1990 | Carter et al. | 364/483 |
| 5,121,500 | 6/1992 | Arlington et al. | 395/750 |

FOREIGN PATENT DOCUMENTS

| | | |
|---|---|---|
| 195203 | 9/1986 | European Pat. Off. . |
| 354480 | 2/1990 | European Pat. Off. . |
| 54-14624 | 3/1979 | Japan . |
| 55-100747 | 7/1980 | Japan . |
| 56-147220 | 11/1981 | Japan . |
| 56-147221 | 11/1981 | Japan . |
| 56-152020 | 11/1981 | Japan . |
| 57-39436 | 3/1982 | Japan . |
| 57-81728 | 5/1982 | Japan . |
| 58-40639 | 3/1983 | Japan . |
| 58-40638 | 3/1983 | Japan . |
| 58-127262 | 7/1983 | Japan . |
| 59-9729 | 1/1984 | Japan . |
| 59-79324 | 5/1984 | Japan . |
| 59-81720 | 5/1984 | Japan . |
| 59-79325 | 5/1984 | Japan . |
| 59-95624 | 6/1984 | Japan . |
| 60-156126 | 8/1985 | Japan . |
| 60-169919 | 9/1985 | Japan . |
| 60-225968 | 11/1985 | Japan . |
| 61-112220 | 5/1986 | Japan . |
| 61-190958 | 8/1986 | Japan . |

(List continued on next page.)

*Primary Examiner*—George B. Davis
*Attorney, Agent, or Firm*—Oblon, Spivak, McClelland, Maier, & Neustadt, P.C.

[57] ABSTRACT

A computer system, according to an embodiment of the present invention comprises a host CPU, an image rendering device, a CRT image memory, a video subsystem, an alternative display converter, an alternative display memory, an LCD controller, a change-of-status (COS) detector, a power up/down controller, and a computer display screen. The COS detector monitors the host CPU, image rendering device, CRT image memory, looking for updates that would require a change in the image displayed on the computer display screen. The COS detector signals the power up/down controller to power-off and/or slow system clocks to the CRT image memory, the video subsystem, the alternative display converter, the alternative display memory, and the LCD controller when there is no change to be made in the image on the computer display screen. And conversely, the COS detector signals the power up/down controller to power-up and/or restore system clocks to full-speed for the CRT image memory, the video subsystem, the alternative display converter, the alternative display memory, and the LCD controller when a change (update) is to be made in the image on the computer display screen.

28 Claims, 5 Drawing Sheets

FOREIGN PATENT DOCUMENTS

| | | |
|---|---|---|
| 61-288725 | 12/1986 | Japan . |
| 61-285521 | 12/1986 | Japan . |
| 62-19922 | 1/1987 | Japan . |
| 62-78617 | 4/1987 | Japan . |
| 62-145458 | 6/1987 | Japan . |
| 63-26716 | 2/1988 | Japan . |
| 63-163912 | 7/1988 | Japan . |
| 63-182724 | 7/1988 | Japan . |
| 63-170712 | 7/1988 | Japan . |
| 63-292312 | 11/1988 | Japan . |
| 1-8419 | 1/1989 | Japan . |
| 1-8418 | 1/1989 | Japan . |
| 1-66719 | 3/1989 | Japan . |
| 1-86224 | 3/1989 | Japan . |
| 1-175015 | 7/1989 | Japan . |
| 1-205220 | 8/1989 | Japan . |

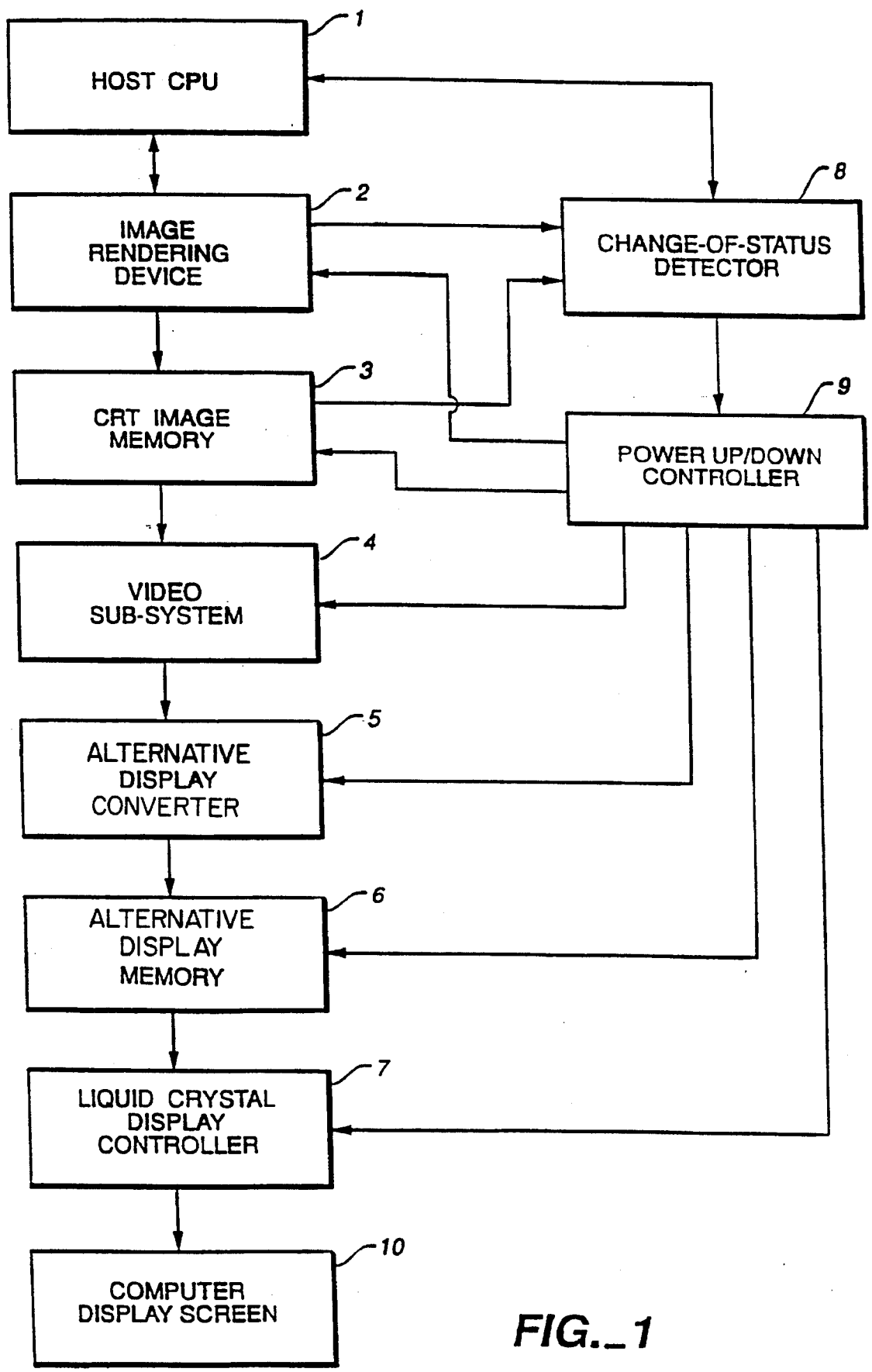
FIG._1

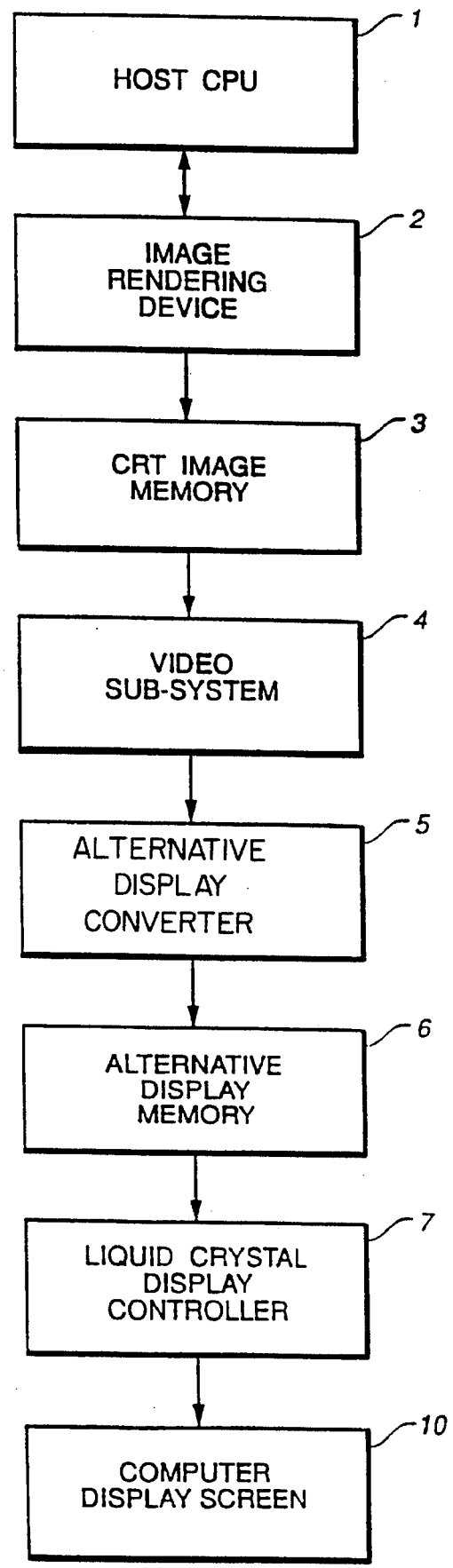
FIG._2
*(PRIOR ART)*

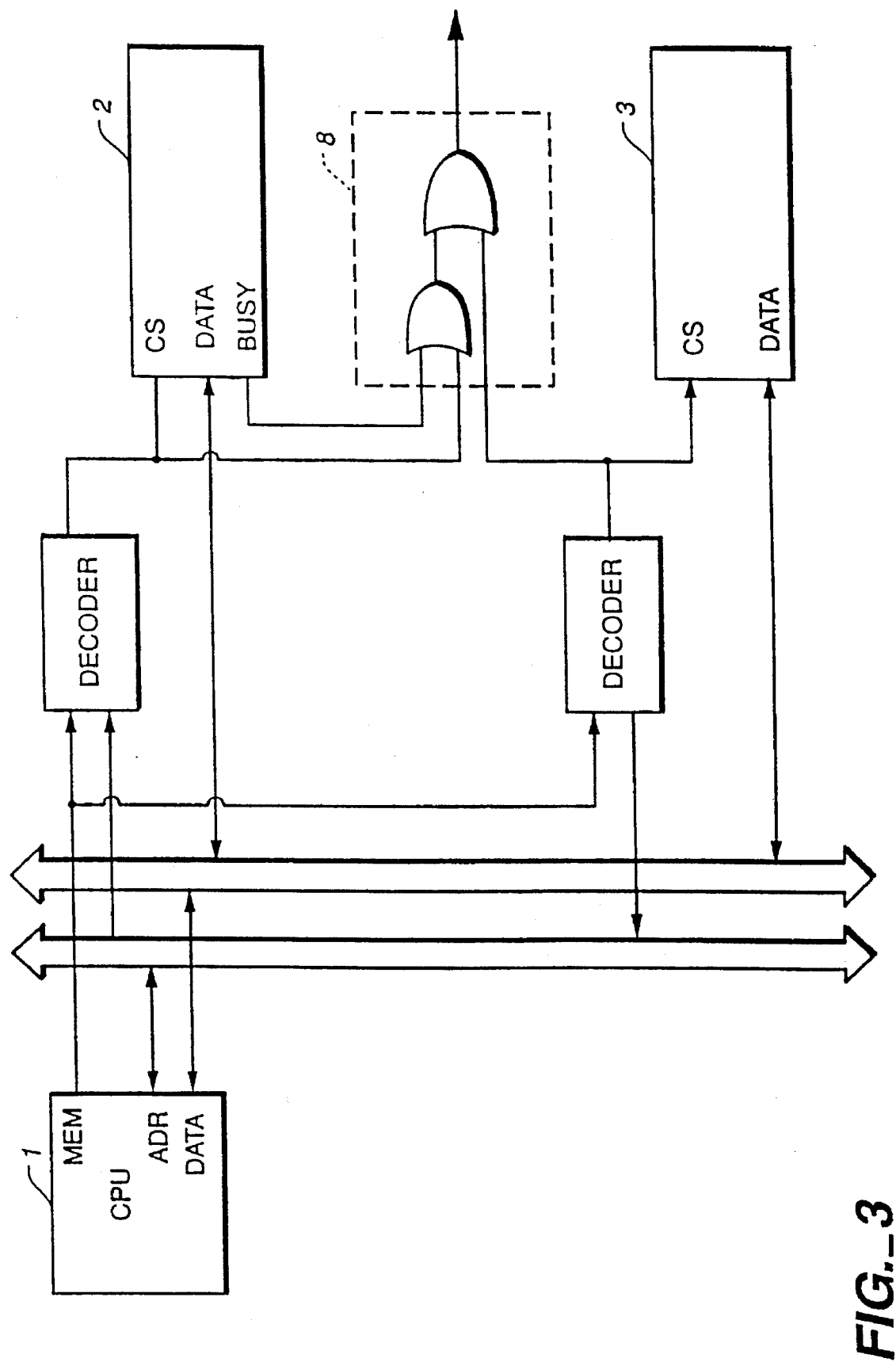
FIG._3

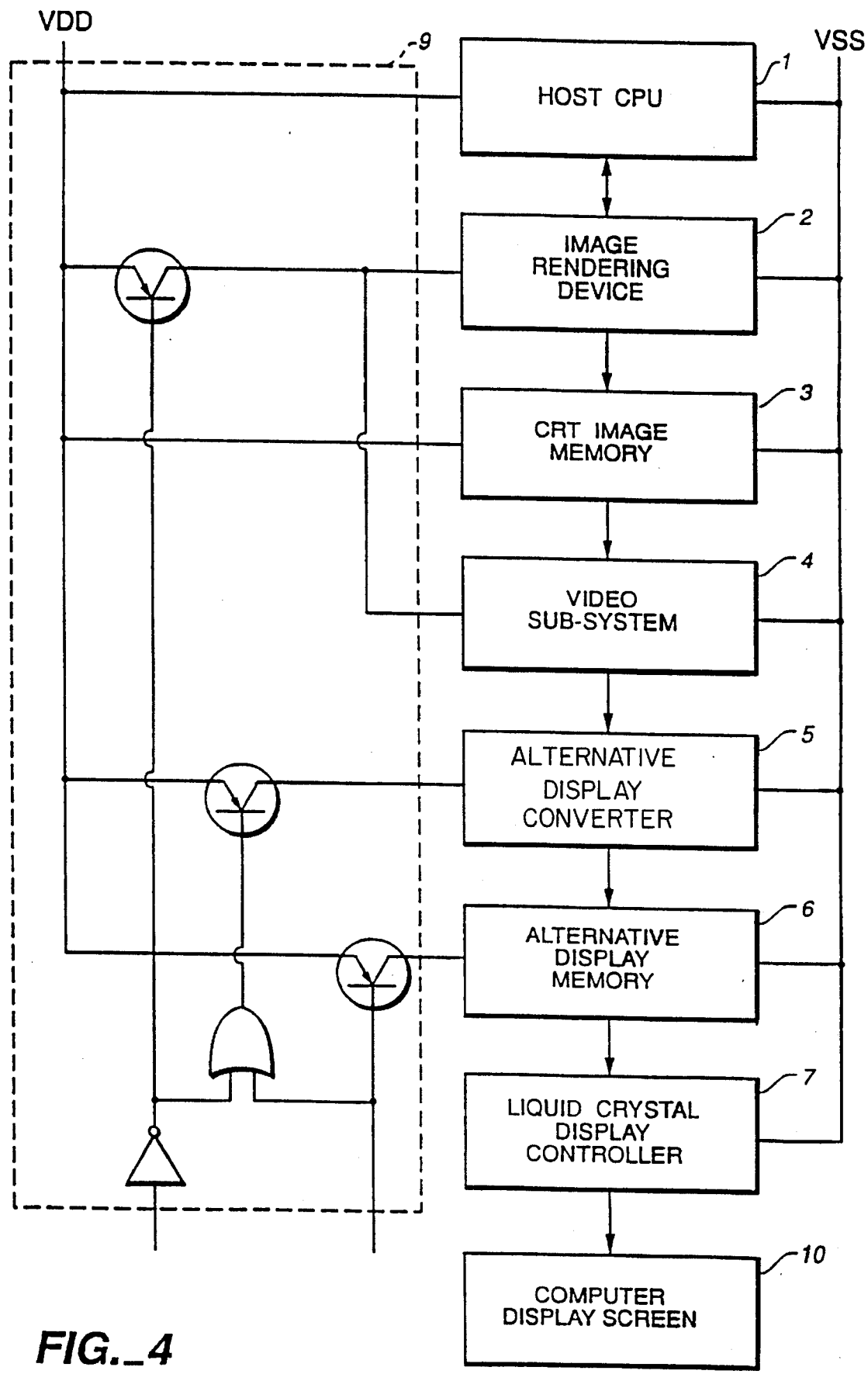
FIG._4

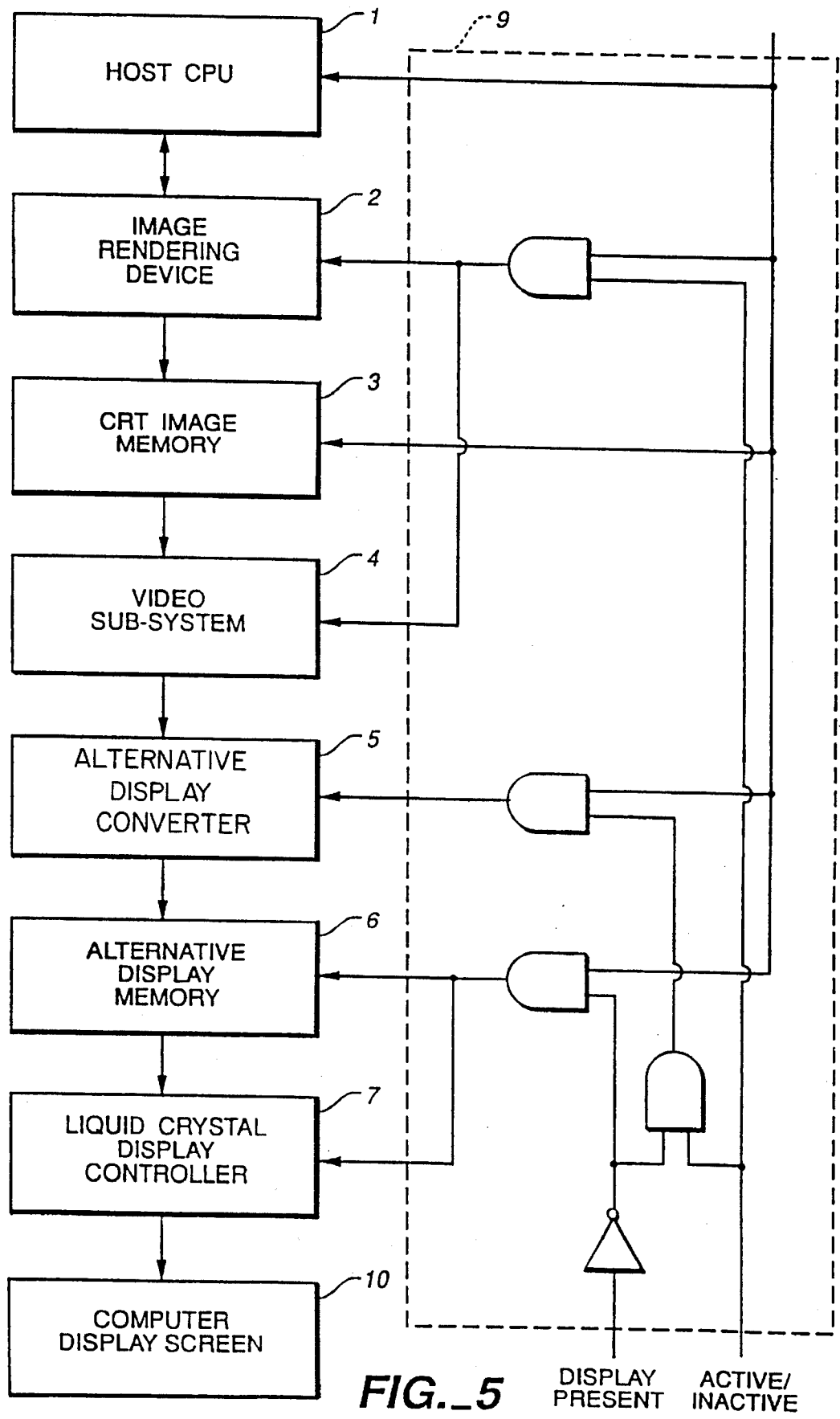
FIG._5

POWER SAVING DISPLAY SUBSYSTEM FOR PORTABLE COMPUTERS

This application is a continuation of application Ser. No. 07/741,016 filed Aug. 6, 1991, now abandoned.

BACKGROUND OF THE INVENTION

1. Field of the Invention

The invention relates to information equipment display devices and specifically to methods and devices for saving the power drawn by displays in computer equipment that are based on liquid crystal displays (LCDs).

2. Copending Application

These Applicants have a copending application Ser. No. 07/728,454 filed on Jul. 11, 1991, that treats the same or related subject matter. The copending application is therefore incorporated here in full and made a part of this application.

Information processing devices have become more-and-more compact and lighter-and-lighter in weight. Portable computers and word processors are now being sold commercially that use a battery as a power source. Such portable computers typically use liquid crystal displays and other low power computer display screen to save on battery drain and thus extend the operational time on each charge. In contrast, most system configurations of desk-top computers use CRT monitors for their computer display screen.

To enable the LCD based portables to run the software written for the desk-top systems, the approach usually taken is for the portables to first produce a CRT type image and then convert that image to a format compatible with an LCD controller.

The power used for the displays in portable computers is often larger than that needed in desk-top computers. It accounts for about one-half of all power consumed in the portable. The higher power consumption presents a serious obstacle in efforts to extend the battery or battery charge life of the portable computer.

Microminiaturization of electronic circuits has advanced to the point that relatively powerful computer systems can be made to be portable and about the size of a book. Unfortunately, portable power supplies, mostly those relying on batteries, have not advanced as far nor as fast. It is not uncommon for the battery of a portable device to outweigh and outsize the device it powers. Making the power supply smaller only shortens operation time because of the reduced capacity.

The operating time available on most portable system is completely inadequate. Since there are only two options to extending operating time, namely, increase power supply capacity or reduce power consumption, a method is needed to reduce power consumption.

It is true that of the several sub-systems that exist in a typical portable computer, only a few are doing any useful work. The rest are on idle. But those circuits that are on idle consume power, and those that are CMOS digital circuits consume power proportional to the clock speed. Therefore, the present invention coordinates the selective shutting down of idle sub-systems and reduces clock speeds to save power.

The present invention reduces power consumption by driving only those circuits in a display subsystem at those times that are absolutely necessary. Since portable computers are often used for word processing, spreadsheet calculation, and data base management, it waits for keyboard input a majority of the time. During its wait, the display does not usually change. So, only some of the display subsystem's circuits are required for operation. Therefore, a significant decrease in power consumption can be realized by turning-off unnecessary circuits or by slowing down or stopping the system clock when waiting for keyboard input or when the display is not being changed.

FIG. 2 is a block diagram of the display circuit of the prior art portable computer. The procedure in FIG. 2 for display output is, as follows:

(1) instructions and data related to the picture are transferred from a host CPU 1 to an image rendering device 2. These instructions and data constitute the character codes, lines, dot positions, color and type for display. The contents of a CRT image memory 3 can also be changed directly from the host CPU 1;

(2) image rendering device 2 modifies the CRT image memory 3 based on instructions and data from the host CPU 1. The contents of the CRT image memory 3 are drawn as characters, lines and dots in locations that correspond to points on a display screen;

(3) a video subsystem 4 converts the data in CRT image memory 3 into a CRT display signal and outputs it. This output is a video signal;

(4) an alternative display converter 5 converts the video signal into a liquid crystal display compatible signal and stores it in an alternative display memory 6; and (5) an LCD controller 7 generates a liquid crystal drive signal based on the contents of the alternative display memory 6 and uses it to drive the computer display screen 10, which is either electrical or chemical in nature.

Devices 1–7 and 10 are implemented in the traditional fashion. There is nothing particularly unique or novel about their construction. So the circuits used in steps (1) to (3), above, will be found in prior art desk-top computers. Therefore no software incompatibility will be sourced by them. Steps (4) and (5) merely convert signals, and are independent of any systems or applications software. Therefore, existing software sold for desk-top computers that use a CRT can also be run on portable computers that use a liquid crystal display, such as in FIG. 2. (For CRT display, the output of the video subsystem can be used as is and a CRT simply connected.)

One disadvantage of the above is that the alternative display converter 5, the alternative display memory 6 and the LCD controller 7 have been added in the portable computer to the circuits normally used in the display system of desk-top computers, resulting in more circuitry and greater power consumption. The increased circuitry increases the size and weight of the computer itself, and the increased power consumption leads to increased battery size and weight and shortens the time the computer can be used continuously on the battery. These disadvantages detract from the portability of portable computers, and so solutions to these problems are important.

Display on liquid crystal displays can be performed with only step (5) above when there is no change in the display, and steps (1) to (4) are not necessary. Display on a CRT can be performed with only step (3) when there is no change in the display, and steps (1), (2), (4) and (5) are not necessary. When computers are used for word processing, spreadsheet calculations and data base management, the time used to change the display is often less than several percent of the total display time.

The present invention takes advantage of these characteristics to reduce power consumption by clearly separating those circuits required when there is a change in the display from those required when there is no change in the display and operating them as required. Further, increased processing speed accompanying data transfer and reduced power consumption can be achieved by exchanging only that data between circuits for which there has been a display change.

The present invention solves the above problems, and its use significantly extends the length of time a portable computer can be used. It does this without affecting software compatibility of the portable to software written for desk-top computers. The portability is also improved by the present invention, as more compact and lighter portable computers are made possible by being able to reduce the size and weight of the battery.

SUMMARY OF THE PRESENT INVENTION

An object of the present invention is to provide a power up/down controller that saves power by slowing or stopping the operation of picture related devices when a change-of-status detector detects that there are no changes that need to be made in the display.

Briefly, an embodiment of the present invention is a display subsystem that comprises a host CPU, an image rendering device, a CRT image memory, a video subsystem, an alternative display converter, an alternative display memory, an LCD controller, a change-of-status (COS) detector, a power up/down controller, and a computer display screen. The COS detector monitors the host CPU, image rendering device, CRT image memory, looking for updates that would require a change in the image displayed on the computer display screen. The COS detector signals the power up/down controller to power-off and/or slow system clocks to the CRT image memory, the video subsystem, the alternative display converter, the alternative display memory, and the LCD controller when there is no change to be made in the image on the computer display screen. And conversely, the COS detector signals the power up/down controller to power-up and/or restore system clocks to full-speed for the CRT image memory, the video subsystem, the alternative display converter, the alternative display memory, and the LCD controller when a change (update) is to be made in the image on the computer display screen.

An advantage of the present invention is that reduced power consumption not only makes it possible to run battery operated computer portable over longer periods, but it also makes it possible to build more compact and lightweight portables that have reduced the battery size and have lowered manufacturing costs by incorporating smaller power supplies.

A further advantage of the present invention is that the advantages can be realized very easily in existing systems. Only the addition of small circuits is required, and any software designed to work with prior art display circuits can usually be run without modifications.

A further advantage of the present invention is that any heat generated by the display circuit is reduced. The reliability of circuit operation is thereby improved, the integration of ICs can be further increased, mounting density can be increased, freedom in mounting can be improved, and fans and plates for dissipating heat can be eliminated.

Other objects and attainments together with a fuller understanding of the present invention will become apparent and appreciated by referring to the following description and claims taken in conjunction with the accompanying drawings.

BRIEF DESCRIPTION OF THE DRAWINGS

FIG. 1 is a block diagram showing a display subsystem of the present invention in a computer system;

FIG. 2 is a block diagram of a prior art display subsystem in a computer system;

FIG. 3 is a circuit diagram of the change-of-status detector used in the subsystem of FIG. 1;

FIG. 4 is a circuit diagram of an exemplary implementation of a portion of the power up/down controller used in the subsystem of FIG. 1 that controls the distribution of the power supply (Vdd, Vss) to other major components of the system; and FIG. 5 is a circuit diagram showing an exemplary implementation of a portion of the power up/down controller used in the subsystem of FIG. 1 that controls the distribution of the system clock to other major components of the system.

DESCRIPTION OF THE PREFERRED EMBODIMENTS

FIG. 1 illustrates a computer with a liquid crystal display, according to an embodiment of the present invention. Elements that are similar or identical to those of FIG. 2 have the same element numbers. The system of FIG. 1 has a host CPU 1, an image rendering device 2, a CRT image memory 3, a video subsystem 4, an alternative display converter 5, an alternative display memory 6, an LCD controller 7, and a computer display screen 10. Unique are a change-of-status detector 8 and a power up/down controller 9. The change-of-status detector 8 judges whether or not there needs to be a change in the display output. The power up/down controller 9 activates the LCD controller and can stop data transfer between image rendering device 2, CRT image memory 3, video subsystem 4, alternative display converter 5, and alternative display memory 6, when there is no change in the display based on the output of the change-of-status detector 8. When there is a change to be made in the display 10, the power up/down controller 9 manipulates image rendering device 2, CRT image memory 3, video subsystem 4, alternative display converter 5, alternative display memory 6, and LCD controller 7.

FIG. 3 shows a more specific implementation of the change-of-status detector 8. A static RAM is used for CRT image memory 3. Changes written for the display can come from two sources and each must be detected. Instructions and data sent from host CPU 1 to the image rendering device 2 can result in writes being made to CRT image memory 3 from device 2. Host CPU 1 can also write CRT image memory 3 directly. The chip select (CS) and BUSY signals of device 2 are logically summed together such that when both are low the output of detector 8 will go low. The chip select (CS) of memory 3 can be monitored, or preferably the AND of the CS and write enable (WE) are summed in detector 8 so that they too will cause an output. (Since CS and WE are negative true, and the opposite of BUSY is "ready," the OR gates illustrated in FIG. 3 function as AND gates.) It is also possible to implement change-of-status detector 8 in software.

FIGS. 4 and 5 illustrate specific ways to implement controller 9. In FIG. 4, the power sources for several of the system elements (2, 4, 5, and 6) are switched on and off by three series transistors. This switching can also be implemented mechanically or with other types of switching elements, e.g. solid state relays. When detector 8 senses a change is required in the display 10, controller 9 switches ON the power sources for image rendering device 2, CRT image memory 3, video subsystem 4, alternative display converter 5, alternative display memory 6, and LCD controller 7. When detector 8 sees there is no change needed in display 10, controller 9 switches ON the power sources for CRT image memory 3, alternative display memory 6, and LCD controller 7. It switches OFF the power sources for the image rendering device 2, video subsystem 4, and alternative display converter 5. FIG. 5 illustrates how controller 9 manipulates the operating clocks of several of the system elements. The control of the operating clocks is accomplished with standard logic gates. When detector 8 senses the display must be updated, the controller 9 supplies a high-speed clock to the image rendering device 2, the CRT image memory 3, the video subsystem 4, the alternative display converter 5, the alternative display memory 6 and the LCD controller 7. When detector 8 senses there is no display update, controller 9 allows a low-speed clock to be supplied to LCD controller 7 and it stops the system clocks to the image rendering device 2, the video subsystem 4, and the alternative display converter 5. If dynamic RAM is used for CRT image memory 3 and/or the alternative display memory 6, the refresh period is simply lengthened to save power. Controller 9 can either switch off the power sources or stop the system clocks, or both. If a CRT is connected, controller 9 can alternatively turn OFF alternative display converter 5, alternative display memory 6, and the LCD controller 7, to save unnecessary power waste.

The above embodiments concern a computer in which a liquid crystal display is used, but the present invention can also be applied to systems that use plasma displays and other types of computer display screens.

The present invention is not limited to computers and can also be applied to reduce the power consumption in word processors and other portable devices.

While the present invention has been described in specific embodiments, it will be evident to those skilled in the art that many further alternatives, modifications and variations are apparent in light of the foregoing description. Thus, the present invention described herein is intended to embrace all such alternatives, modifications, applications and variations as may truly fall within the spirit and scope of the appended claims.

What is claimed is:

1. A display control system for controlling display on a liquid crystal display device of image data which can be changed due to user operation, comprising:

an image memory for storing said image data; display control means for reading out said image data from said image memory and producing display data for said liquid crystal display device;

detecting means for detecting whether or not said image data stored in said image memory is to be changed and producing a detection signal indicative thereof;

a power source for supplying power to said display control means; and power control means, which receives said detection signal, for controlling said power supplied to the display control means in response to the received detection signal, thereby saving an amount of power consumed by said display control means.

2. A display control system in accordance with claim 1, wherein said power control means comprises:

means for reducing said power supplied to said display control means when said detection signal indicates that said image data is not to be changed.

3. A display control system in accordance with claim 2, wherein:

said display control means comprises means for changing said image data stored in said image memory; and said detecting means comprises means for detecting whether said display control means is to execute said changing.

4. A display control system in accordance with claim 2, wherein:

said display control means comprises means for changing said image data stored in said image memory; and said detecting means comprises means for detecting whether said image memory is to be accessed by said display control means.

5. A display control system in accordance with claim 1, wherein said power control means comprises:

means for stopping supply of power to said display control means when said detection signal indicates that said image data is not to be changed.

6. A display control system in accordance with claim 6, wherein:

said display control means comprises means for changing said image data stored in said image memory; and said detecting means comprises means for detecting whether said display control means is to execute said changing.

7. A display control system in accordance with claim 5, wherein:

said display control means comprises means for changing said image data stored in said image memory; and said detecting means comprises means for detecting whether said image memory is to be accessed by said display control means.

8. A display control system for controlling display on a liquid crystal display device of image data which can be changed due to user operation, comprising:

an image memory for storing said image data;

display control means for reading out said image data from said image memory and producing display data for said liquid crystal display device;

detecting means for detecting whether or not said image data stored in said image memory is to be changed and producing a detection signal indicative thereof;

a clock generator for supplying a clock signal to said display control means; and clock control means, which receives said detection signal, for controlling said clock signal supplied to said display control means in response to the received detection signal.

9. A display control system in accordance with claim 8, wherein:

said clock generator comprises means for generating a high-frequency clock signal and a low-frequency clock signal; and said clock control means comprises means for controlling supply of said high-frequency clock signal to said display control means when said detection signal indicates that said image data is to be changed, and controlling supply of said low-frequency clock signal to said display control means when said detection signal indicates that said image data is not to be changed.

10. A display control system in accordance with claim 9, wherein:

said display control means comprises means for changing said image data stored in said image memory; and said detecting means comprises means for detecting whether said display control means is to execute said changing.

11. A display control system in accordance with claim 9, wherein:

said display control means comprises means for changing said image data stored in said image memory; and said detecting means comprises means for detecting whether said image memory is to be accessed by said display control means.

12. A display control system in accordance with claim 8, wherein:

said clock control means comprises means for disabling said clock signal supplied to said display control means when said detection signal indicates that said image data is not to be changed.

13. A display control system in accordance with claim 12, wherein:

said display control means comprises means for changing said image data stored in said image memory; and said detecting means comprises means for detecting whether said display control means is to execute said changing.

14. A display control system in accordance with claim 12, wherein:

said display control means comprises means for changing said image data stored in said image memory; and said detecting means comprises means for detecting whether said image memory is to be accessed by said display control means.

15. A display control apparatus for controlling display on a liquid crystal display device of image data which can be changed due to user operation, comprising:

a first memory for storing image data;

a second memory for storing display data for said liquid crystal display device;

display control means for reading out said image data from said first memory to produce said display data, and writing said display data into said second memory;

detecting means for detecting whether or not said image data stored in said first memory is to be changed and producing a detection signal indicative thereof;

a power source for supplying power to said display control means; and power control means, which receives said detection signal, for controlling said power supplied to said display control means in response to the received detection signal, thereby saving an amount of power consumed by said display control means.

16. A display control apparatus in accordance with claim 15, wherein said power control means comprises:

means for reducing said power supplied to said display control means when said detection signal indicates that said image data is not to be changed.

17. A display control apparatus in accordance with claim 6, wherein:

said display control means comprises means for changing said image data stored in said first memory; and said detecting means comprises means for detecting whether said display control means is to execute said changing.

18. A display control apparatus in accordance with claim 16, wherein:

said display control means comprises means for changing said image data stored in said first memory; and said detecting means comprises means for detecting whether said first memory is to be accessed by said display control means.

19. A display control apparatus in accordance with claim 15, wherein said power control means comprises:

means for stopping supply of power to said display control means when said detection signal indicates that said image data is not to be changed.

20. A display control apparatus in accordance with claim 19, wherein:

said display control means comprises means for changing said image data stored in said first memory; and said detecting means comprises means for detecting whether said display control means is to execute said changing.

21. A display control apparatus in accordance with claim 19, wherein:

said display control means comprises means for changing said image data stored in said first memory; and said detecting means comprises means for detecting whether said first memory is to be accessed by said display control means.

22. A display control apparatus for controlling display on a liquid crystal display device of image data which can be changed due to user operation, comprising:

a first memory for storing image data;

a second memory for storing display data for said liquid crystal display device;

display control means for reading out said image data from said first memory to produce said display data, and writing said display data into said second memory;

detecting means for detecting whether or not said image data stored in said first memory is to be changed and producing a detection signal indicative thereof;

a clock generator for supplying a clock signal to said display control means; and clock control means, which receives said detection signal, for controlling said clock signal supplied to said display control means in response to the received detection signal.

23. A display control apparatus in accordance with claim 22, wherein:

said clock generator comprises means for generating a high-frequency clock signal and a low-frequency clock signal; and said clock control means comprises means for controlling supply of said high-frequency clock signal to said display control means when said detection signal indicates that said image data is to be changed, and controlling supply of said low-frequency clock signal to said display control means when said detection signal indicates that said image data is not to be changed.

24. A display control apparatus in accordance with claim 23, wherein:

said display control means comprises means for changing said image data stored in said first memory; and said detecting means comprises means for detecting whether said display control means is to execute said changing.

25. A display control apparatus in accordance with claim 23, wherein:

said display control means comprises means for changing said image data stored in said first memory; and said detecting means comprises means for detecting whether said first memory is to be accessed by said display control means.

26. A display control apparatus in accordance with claim 22, wherein said clock control means comprises:

means for disabling said clock signal supplied to said display control means when said detection signal indicates that said image data is not to be changed.

27. A display control apparatus in accordance with claim 26, wherein:

said display control means comprises means for changing said image data stored in said first memory; and said detecting means comprises means for detecting whether said display control means is to execute said changing.

28. A display control apparatus in accordance with claim 26, wherein:

said display control means comprises means for changing said image data stored in said first memory; and said detecting means comprises means detecting whether said first memory is to be accessed by said display control means.

* * * * *